March 30, 1937. C. STAHL 2,075,551
PARING MACHINE
Filed March 4, 1935
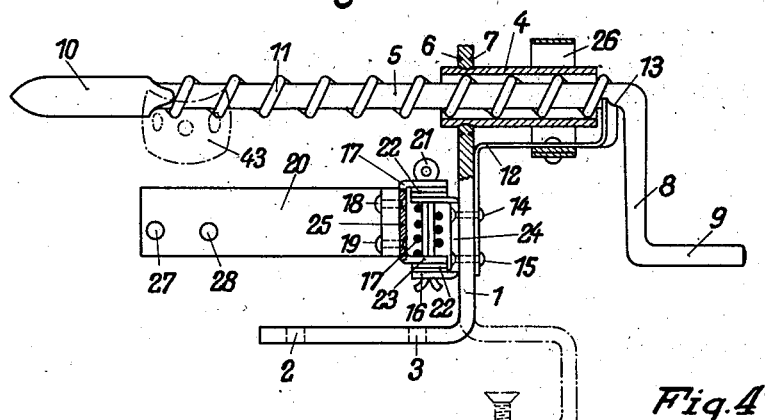
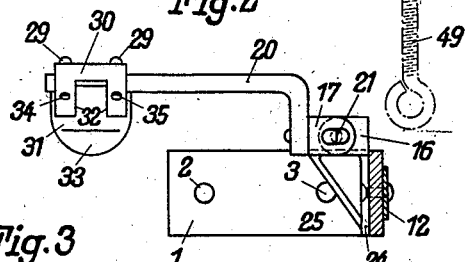
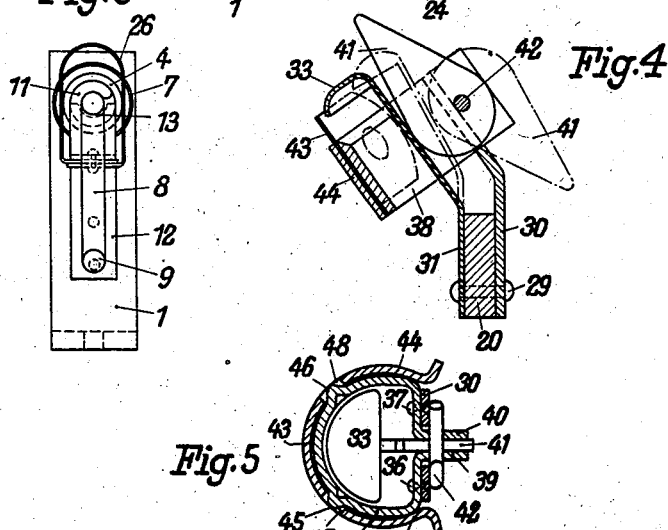
Inventor:
Carl Stahl
by Knight Bros
His attorneys Patented Mar. 30, 1937

2,075,551

UNITED STATES PATENT OFFICE 2,075,551

PARING MACHINE

Carl Stahl, Berlin-Wilmersdorf, Germany

Application March 4, 1935, Serial No. 9,290
In Germany March 5, 1934

6 Claims. (Cl. 146—43)

This invention relates to such improvements in paring machines which will not only insure universal application to any kind of fruit, potatoes, etc., and an easy adjustability to regulate the required thickness of the peeling but also simplify generally the construction of such machines so as to bring down the manufacturing costs and the selling price to the very lowest possible limit, at the same time providing means for facilitating, cleaning and replacement of the peeling knife.

Paring machines for potatoes, fruit and the like are well known in which the paring knife consists of a bent special blade which machines, however, are comparatively expensive in the manufacturing process and which furthermore have the disadvantage that spare knife-blades are difficult to obtain, particularly in out-of-the-way-places, especially abroad, so that the otherwise serviceable tool becomes useless when once the paring knife blade has become dull and is spoiled by corrosion.

The present invention provides therefore a paring machine in which as knife-blade the usual commercial razor-blade can be employed, bent in the shape of a horse-shoe around a correspondingly formed support to which the bent blade will be secured in an easily detachable manner by means of a springy or resilient holder. The invention further provides upon said curved support projections entering the holes provided in all commercial razor-blades to insure the position of the latter, which projections also penetrate corresponding holes arranged in the resilient holder.

The application of razor-blades for any such purposes has the very important advantage that this main spare part can be easily had in any out-of-the-way-places and countries in perfect quality at a very cheap price owing to the general use of such razors all over the world and the fact that they are all standardized to universal measurements. Moreover, such blades are always provided with two cutting-edges and the object of this invention provides therefore for turning the blade in case of the one edge having become dull and useless. Finally, it is well known that many cheap grinding instruments for sharpening such blades are on the market and in household use for assisting in prolonging the useful application of such blades which, moreover, owing to the thinness of the blades and the easier work to which they are subjected for paring purposes can be used for a much longer period in comparison to their use as a razor.

The bent support of the blade, as well as the resilient holder are positioned so as to leave free always one of the cutting edges of the blade, while the other will be completely covered to protect it against damages and moisture.

It will be, of course, essential, to arrange this mechanism so as to be able to vary the thickness of the peeling and to this end the invention provides an adjustable abutment regulating the thickness of the peeling. This abutment corresponds in shape to the bent blade and forms part of a leaf-spring subject to adjustment by a small eccentric lever provided with a pointed handle for its operation and serving at the same time as an indicator for the thickness of the peeling to be adjusted. This cam-surface of the eccentric, resting against the springy abutment, may preferably consist of several flattened portions so as to insure each small turning operation corresponding to a certain thickness of the peeling.

This whole cutting mechanism including the springy abutment may be preferably fixed by common means to the free end of a swinging arm, fulcrumed at its opposite end upon a vertical shaft secured to the machine frame.

According to this invention the curved blade support is formed of metal sheet, the free ends of which are bent so as to serve as bearing for the shaft of the eccentric, regulating the thickness of peeling. The projections of the blade support insuring the position of the blade may be pressed out of said bent metal sheet to simplify the manufacturing process.

In the accompanying drawing one form of execution of this invention is shown:

Figure 1, representing a side-view partly in section,

Figure 2, showing partly in section a part plan view of Figure 1,

Figure 3, a part of Figure 1, seen from the right-hand side,

Figure 4, representing a cross-section of the blade-holder on an enlarged scale vertical to the transporting spindle, Figure 4a, showing a modified form of eccentric, and Figure 5, showing a section through the eccentric shaft parallel to the upper edge of the razor-blade seen from above also on an enlarged scale.

A flat-iron angle part 1 is provided with 2 borings 2 and 3, which may serve for securing the apparatus to a table support. The vertical angle part 1 is provided at its upper end with a boring for receiving a tubular part 4 serving as a guide for the transporting spindle 5. This tube 4 may be secured in the angle part 1 simply by reducing the boring after the tube 4 has been inserted by pressing 2 concentric grooves 6 and 7 into this flat iron angle part 1. The transporting spindle 5 terminates at one end in a crank 8, 9, while it is flattened out at its opposite end to a knife-like projection 10, the width of which being smaller than the inside diameter of the tubular part 4, so as to allow of withdrawing the transporting spindle 5 completely for cleaning purposes. The spindle thread is formed by means of a spiral wire 11 suitably secured at both ends to said spindle 5. This fastening operation may be cheaply done by soldering or welding or by applying a metal coating of zinc or tin thereto after the wire spiral has been put in place. The spindle thread 11 engages at the crank end with a leaf-spring 12 Z-shaped and secured with its opposite end to the flat iron part 1 by means of rivets 14, 15, simultaneously serving for securing the fulcrum support 16. The other fulcrum part 17 is secured to a flat iron angle-piece 20 by means of rivets 18 and 19. The fulcrum shaft may be formed by a simple splitpin 21 passing through both parts 16 and 17 and through several spacing washers 22. A spiral spring 23 surrounds the splitpin 21 and is secured at both ends so as to force the angle 20 in clock-wise direction with a view to Figure 2.

The fulcrum half 17 has a projection 25 arranged so as to engage the part 24 when the flat iron angle piece 20 under the action of spring 23 has reached its end-position. A flat-iron loop 26 is riveted on the leaf-spring 12 so as to surround the tubular part 4 with a certain distance in such way that a depression of this loop 26 brings the wire spiral 11 out of engagement for shifting the spindle axially or for withdrawing it completely. The free end of the flat-iron piece 20 is provided with two borings 27 and 28 and these serve for securing by rivets 29 a slightly bent-off angle piece 30 and a similarly bent leaf-spring 31. The free outer end of part 30 is recessed as shown at 32 (Fig. 2), while the outer end of the leaf spring 31 is bent-off at a right angle, more or less in the form of a curved hood 33, which cooperates with the working edge of the bent razor-blade. The upper recessed end of the angle-piece 30 is provided with two borings 34 and 35 for securing to it a bent metal sheet part 38 by means of rivets 36 and 37. This part 38 forms essentially a half circular hollow body and its free ends 39 and 40 are parallelly bent-off so as to rest against an eccentric lever 41 which turns upon a split-pin 42 which passes through borings in these ends 39 and 40, as well as in the eccentric lever 41. The outside surface of this bent part 38 serves as a support for a correspondingly bent razor blade 43 pressed against this support by means of a half circular leaf spring 44. The lever on the eccentric 41 consists of a pointed projection on the operative surface of said eccentric and serves simultaneously as an indicator for the relative position of the curved hood 33 with respect to the razor blade 43 and consequently for the thickness of the peeling. The blade-support 38 has two projections 45 and 46 penetrating the standard holes in the razor-blade 43, as well as two corresponding holes 47 and 48 in the leaf-spring 44. The free ends of the latter are bent so as to slightly grip over the support 38, and all these parts are arranged so as to leave free the upper edge of the razor blade 43, while the lower edge will be completely covered. The leaf-spring 31 has only a contact relation with the eccentric lever 41.

By turning the crank 8—9 any fruit secured to the knife 10 may be rotated and through the spindle 5—11 may be led past the obliquely adjusted bent razor-blade 43, thus peeling the fruit spirally in the usual manner. By adjusting the eccentric 41 upon its shaft 42, the position of the hooded part 33 of the leaf-spring 31 with regard to the razor-blade 43 may be varied so as to increase or decrease the distance between these parts 43 and 33, whereby the peeling will become of more or less thickness as may be required. The face of the eccentric 41, being always in contact with the leaf spring 31, instead of being circular or curved, (as shown in Fig. 4), may be arranged broken into a number of short flattened surfaces (as shown in Fig. 4a) on the eccentric 41a, so as to facilitate the fixation of the eccentric in each adjusted position. The upper edge of the razor-blade 43 will be continuously pressed against the circumference of the fruit to be peeled with a fairly uniform pressure of the spiral spring 23.

By pressing down by hand the loop 26, the leaf-spring 12 will be brought out of engagement with the spindle-thread 11 which allows of shifting axially the spindle with the attached fruit without turning the spindle. The washers 22 may be distributed, as shown in Fig. 1, or they may be arranged more or less on top or below, as the case may be, in order to properly adjust the position of the razor-blade with regard to the fruit to be peeled. In order to prevent that the cutting edge of the razor-blade 43 comes into contact with the metal parts 10 and 11, when no fruit, potato, or the like, is fixed to the knife 10, the projection 25 of the fulcrum part 17 is bent so that its free end abuts against the other fulcrum part 16, thus limiting the swinging operation of the blade-holder 20. By removing the springy holder 44 the razor blade may be easily taken out for cleaning purposes or for replacement. The flat-iron angle 1 may be also formed as shown in dotted lines in Fig. 1, so as to be detachably fixed to a table by means of screw 49.

The form of execution of this invention may, of course, somewhat vary in certain details, but the combination of a rough spindle construction for the turning operation of the fruit and easily detachable from the spindle-guide for adjustment and removal with a spring supported paring device embodying an ordinary razor-blade bent in the form of a horse-shoe and having only an edge more or less adjustably exposed for the peeling operation to regulate the thickness of the peeling, should be maintained together with the securing means for said bent blade by employing its standardized holes and a springy holder keeping the blade in its position for facilitating cleaning and replacement of same.

Having thus described my invention, with reference to the accompanying drawing, what I claim and desire to secure by Letters Patent is:

1. In a paring machine with a screw-threaded hand-operated spindle holding the fruit to be pared, a peeling knife arrangement, comprising a standardized safety razor blade bent about its shorter center line in the shape of a horse-shoe turned with its convex side towards the fruit, a similarly formed supporting member therefore, and a leaf-spring holder member for firmly securing the said blade in its position, one of said members having projections for engaging the standardized holes in said blade and corresponding holes in the other member; and a spring supported swinging arm for said peeling knife arrangement for pressing it against the fruit to be peeled.

2. In a paring machine with a screw-threaded hand-operated spindle holding the fruit to be pared, a peeling knife arrangement, comprising a standardized safety razor blade bent about its shorter center line in the shape of a horse-shoe turned with its convex side towards the fruit, a similarly formed support therefore, a corresponding leaf-spring holder covering said blade so as to expose only one of the sharpened edges of the blade, and means for securing the relative position of support, blade and holder; a leaf-spring abutment terminating with its end in close proximity to the exposed safety razor blade edge and tending to move away from the same by its spring action; an eccentric acting against said leaf-spring and adapted, when turned about its axis, to control the distance of the outer edge of said leaf-spring from the exposed razor blade edge so as to vary the thickness of the peeling; and spring-supported means for said peeling knife arrangement for pressing it against the fruit to be peeled.

3. In a paring machine with a screw-threaded hand-operated spindle holding the fruit to be pared, a peeling knife arrangement, comprising a standardized safety razor blade bent about its shorter center line in the shape of a horse-shoe turned with its convex side towards the fruit, a similarly formed support therefore, a corresponding leaf-spring holder surrounding said blade, and means for securing the relative position of support, blade and holder; a leaf-spring abutment terminating with its end in close proximity to the exposed safety razor blade edge; an eccentric to control the distance of the said abutment from the said razor blade edge; and a pointed projection on the operative surface of said eccentric for turning it about its axis and serving as an indicator for the relative position of the leaf-spring abutment and the safety razor blade edge; and spring supported means for said peeling knife arrangement for pressing it against the fruit to be peeled.

4. In a paring machine with a screw-threaded hand-operated spindle holding the fruit to be pared, a peeling knife arrangement, comprising a standardized safety razor blade bent about its shorter center line in the shape of a horse-shoe turned with its convex side towards the fruit, a similarly formed support therefore, a corresponding leaf-spring holder, covering said blade so as to expose only one of the sharpened edges of the blade, and means for securing the relative position of support, blade and holder; a leaf-spring abutment terminating with its end in close proximity to the exposed safety razor blade edge, an eccentric to control the distance of the said abutment from the said razor blade edge, the said eccentric having several flattened faces on its operative surface for securely maintaining its relative position in its turning movement; and spring supported means for said peeling knife arrangement for pressing it against the fruit to be peeled.

5. In a paring machine with a screw-threaded hand-operated spindle holding the fruit to be pared, a peeling knife arrangement, comprising a standardized safety razor blade bent about its shorter center line in the shape of a horse-shoe turned with its convex side towards the fruit, a similarly formed support therefore, a corresponding leaf-spring holder covering said blade so as to expose only one of the sharpened edges of the blade, and means for securing the relative position of support, blade and holder; a leaf-spring abutment terminating with its end in close proximity to the exposed safety razor blade edge; an eccentric to control the distance of the said abutment from the said razor blade edge; and a shaft for said eccentric journaled in parallelly bent over ends of the safety razor blade support, said ends serving simultaneously as guide for said eccentric; and spring supported means for said peeling knife arrangement for pressing it against the fruit to be peeled.

6. In a paring machine with a screw-threaded hand-operated spindle holding the fruit to be pared, a peeling knife arrangement, comprising a standardized safety razor blade bent about its shorter center line in the shape of a horse-shoe turned with its convex side towards the fruit, a similarly formed supporting member therefore, and an easily detachable leaf-spring holder member covering and overlapping said blade and support, one of said members having impressed indentations for engaging the standardized holes of said blade and corresponding holes in the other member; means including an abutment adjacent said blade and an eccentric to adjust the distance of said abutment from said blade, for controlling the thickness of the peeling; and a spring supported swinging arm for said peeling knife arrangement for pressing it against the fruit to be peeled.

CARL STAHL.